United States Patent [19]

Crook

[11] 3,842,404

[45] Oct. 15, 1974

[54] DATA DISPLAY

[75] Inventor: Keith Jeremy Crook, Hitchin, England

[73] Assignee: International Computers Limited, London, England

[22] Filed: Sept. 25, 1973

[21] Appl. No.: 400,676

Related U.S. Application Data

[63] Continuation-in-part of Ser. No. 219,737, Jan. 21, 1972.

[52] U.S. Cl. .............................................. 340/172.5
[51] Int. Cl. ............................................... G06f 3/14
[58] Field of Search ...................... 340/172.5, 324 A

[56] References Cited

UNITED STATES PATENTS

| | | | |
|---|---|---|---|
| 3,297,994 | 1/1967 | Klein | 340/172.5 |
| 3,413,610 | 11/1968 | Botjer et al. | 340/172.5 |
| 3,453,384 | 7/1969 | Donner et al. | 340/172.5 X |
| 3,539,999 | 11/1970 | Houldin et al. | 340/172.5 |
| 3,543,244 | 11/1970 | Cuccio | 340/172.5 |
| 3,555,519 | 1/1971 | Nercessian | 340/172.5 |
| 3,555,520 | 1/1971 | Helbig et al. | 340/172.5 |
| 3,573,740 | 4/1971 | Berger et al. | 340/172.5 |
| 3,611,301 | 10/1971 | Parks | 340/172.5 |

*Primary Examiner*—Raulfe B. Zache
*Attorney, Agent, or Firm*—Hane, Baxley & Spiecens

[57] ABSTRACT

A data display system has separate channels for data and commands from a processor for different display units. Data is multiplexed from the channels to common storage and gated therefrom to the display units in corresponding sequence. Individual storage for commands from each channel enables commands for one channel to be received while the preceding channel is being displayed.

5 Claims, 2 Drawing Figures

DATA DISPLAY

CROSS REFERENCE TO RELATED APPLICATION

Continuation-in-part of U.S. Pat. application Ser. No. 219,737.

BACKGROUND OF THE INVENTION

The invention relates to data display.

It is often desired in a computer installation to display different sets of data on separate display units. To do this simultaneously over parallel channels individually interconnecting the display units and the computer would require a very high data output rate. A solution is to multiplex the sets of data and feed the display units sequentially, thereby reducing the data rate virtually to that required for one display unit. A problem arises with high speed repetitive display units when instruction signals are required to control the action of the display unit and the data. This is because the interval between feeding data for successive units is desirably as short as possible, especially using television type displays.

SUMMARY OF THE INVENTION

According to the invention there is provided a data display system comprising a processor; a plurality of high speed repetitive display units; timing means for producing sequencing signals for selecting each of said display units in turn; a plurality of signal channels from said processor, one for each display unit, each channel comprising separate command and data signal paths; data signal storage means, common to all said data signal paths; first switching means, responsive to said sequencing signals, for connecting the data signal path corresponding to the currently selected display unit to the data storage means; second switching means, responsive to said sequencing signals, for applying data from the data storage means to the currently selected display unit for updating the display provided by that unit; a plurality of command signal storage means respectively connected to said command signal paths, each command storage means thus being capable of having command signals written into it from its corresponding command signal path during periods when the corresponding display unit is not selected; third switching means, responsive to said sequencing signals, for selecting command signals from the command storage means corresponding to the currently selected display unit; and control means responsive to the command signals so selected by said third switching means to control read in and read out of data to and from said data storage means.

BRIEF DESCRIPTION OF THE DRAWING

One data display system in accordance with the invention will now be described, by way of example, with reference to the accompanying schematic drawings of which

DESCRIPTION OF THE PREFERRED EMBODIMENTS

Figure 1:
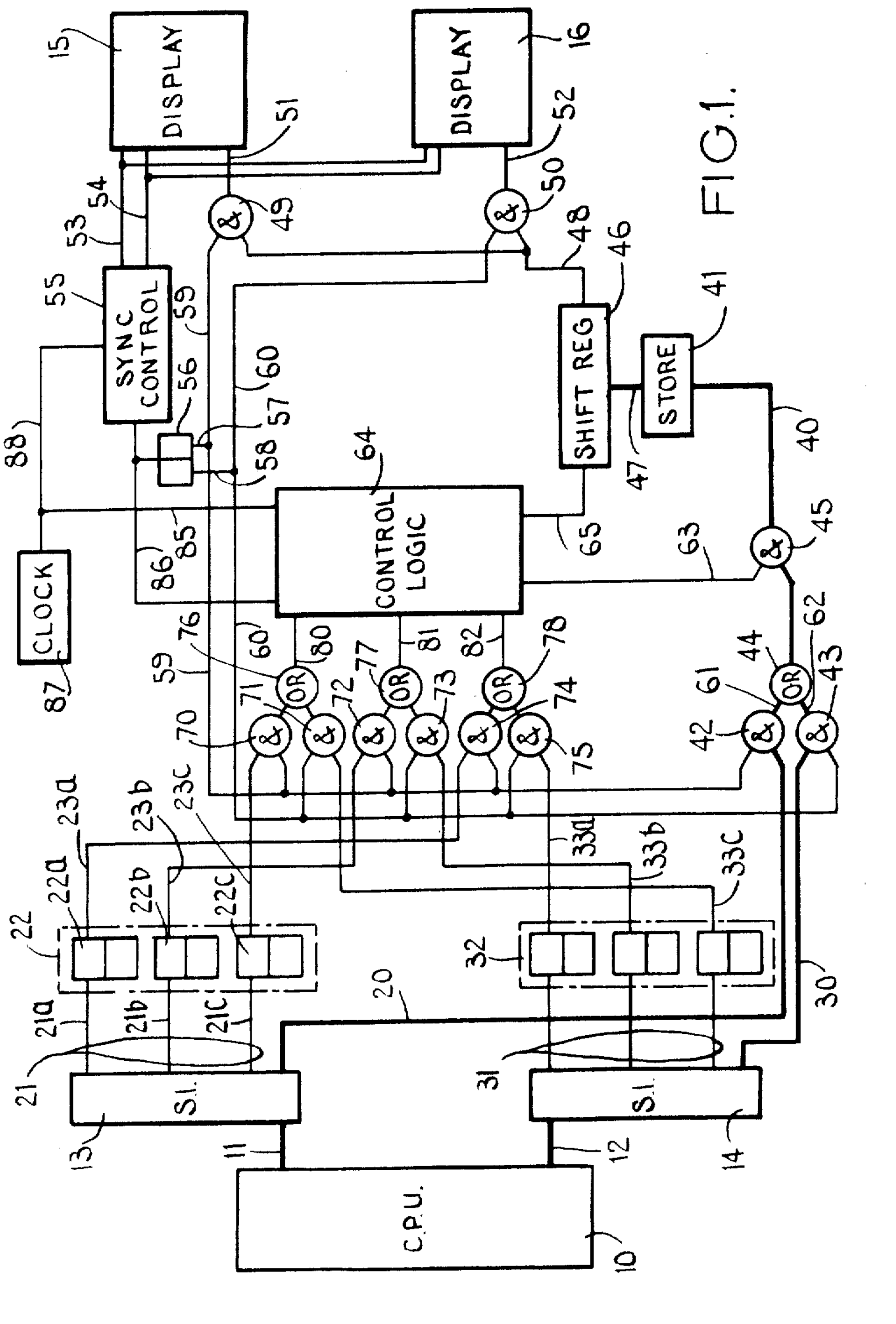
FIG. 1 is a circuit diagram of system and FIG. 2 is a circuit diagram of a part of the system shown in block form in FIG. 1.

Referring to FIG. 1, a central processor unit is shown as a block 10 connected by cables 11 and 12 to two standard interfaces 13 and 14, each connected to a different signal channel for data and command signals for two television type display units 15 and 16, both of which are of known form.

Each unit 15, 16 includes a cathode ray tube having a screen on which data is displayed. The display is in a conventional alphanumeric form (i.e., numerals, alphabetical letters and other symbols) representing data read from the central processor unit 10. The cathode ray tube is scanned cyclically in a conventional television type raster, by means of conventional horizontal and vertical scanning circuits (not shown) so as to build up the required display from a large number of successive lines. Each frame (i.e., cycle) of the display may be formed from two interlaced half-frames, in conventional manner, but this is not essential to the present invention.

The processor unit 10 has storage, for example core storage, for the signals for each display. As will be described, data is fed from the processor 10 to the two display units 15 and 16 in alternate time slots, each equal to one frame period of a single display unit.

The two signal channels, which will be referred to as channel A and channel B, include the standard interfaces 13 and 14 respectively. The display units 15 and 16 correspond with channels A and B, respectively.

Channel A includes a plurality of data lines, indicated by a thick line 20, and command lines 21 extending from the standard interface to a temporary store 22 for command signals concerning the next time slot allocated to the display unit 15. Three command signal lines **21*a*, 21*b* and 21*c* are shown, and the temporary store is shown to comprise three flip-flops 22*a*, 22*b*, 22*c* whose states represent the command signal values, respectively, available on output lines 23*a*, 23*b* and 23*c*.**

Channel B is similarly associated with data lines 30, command signal lines 31, command signal store 32, and output lines **33*a*, 33*b* and 33*c* which correspond in significance with the channel A command output lines 23*a*, 23*b* and 23*c*,** respectively.

The two sets 20 and 30 of data lines are connected alternately over lines 40 to a store 41 via gates 42, 43, 44 and 45 of a gating arrangement to be described. The store 41 acts as a buffer in a bit serialiser also including a shift register 46 fed from the store 41 over lines 47.

The serialised output of the shift register 46 appears on line 48 and is passed via one of gates 49 and 50 of the gating arrangement to one or the other of the display units 15 and 16 corresponding to channels A and B. The outputs 51 and 52 of the gates 49 and 50, respectively, constitute video signals for the television units 15 and 16.

A synchronisation control circuit 55 is responsive to clock signals received along a line 88 from a clock 87, and serves to develop the conventionally required line and frame synchronisation signals for the horizontal and vertical scanning circuits of the display units 15 and 16. These line and frame synchronisation signals appear as lines 53 and 54 respectively, and are applied simultaneously to both display units. The circuit 55 also produces a further output signal on a third output line 86, consisting of pulses at the frame rate, indicating the completion of a frame by one of the display units.

The video signals appear on lines 51 and 52 alternately for successive time slots or display unit cycles under the control of a timing circuit or sequencer for controlling enablement of the AND gates 49 and 50. A suitable circuit for two display units 15 and 16 is a bistable element 56 having complementarily energised outputs 57 and 58. The bistable element 56 is switched from one state to the other at the end of each complete frame period (i.e., the end of each time slot) by means of the signal from the third output 86, of the sync control circuit 55. This causes alternate enabling of the AND gates 49 and 50 of the aforementioned gating arrangement over lines 59 and 60 respectively.

These signals on lines 59 and 60 are complementary and also serve to enable alternately AND gates 42 and 43, respectively, for successive time slots, to pass the data signals on lines 20 and 30 corresponding to channels A and B.

The multiple outputs 61 and 62 of the AND gates 42 and 43 pass via OR gate 44 to inputs of AND gate 45, which, when enabled over line 63 from control logic 64 of the gating arrangement, is effective to pass the data signals to the multiple lines 40. The control logic 64 is also effective to provide shift signals for the shift register 46 over line 65.

It is clear that the data lines 20 and 30 of each channel can only have access to the buffer store 41 during alternate time slots. However, the command lines 21 and 31 of each channel always have access to the corresponding temporary stores 22 and 32. This means that commands concerning the next action relative to the data in one channel can be presented and stored during a time slot when a display unit cycle is devoted to the other channel. It is thus not necessary in the case envisaged of stored commands, for an instruction to be fetched from the computer store and presented between display unit cycles. A program can prime the control ready for the next available cycle or time slot instead of being required to answer an interrupt very rapidly.

It is necessary to examine the contents of the temporary stores 22 and 32 on time slots devoted to the corresponding channel. This is done using the outputs 57 and 58 of the sequencer bistable 56 and a set of AND gates 70 to 75 of the gating arrangement.

The AND gates 70–75 are associated in pairs 70 and 71, 72 and 73, 74 and 75 which have their outputs connected to two input OR gates 76, 77, 78 respectively.

The AND gates 70 and 71 each have one input connected to corresponding outputs 23*c* and 33*c*, respectively, of the temporary stores 22, 32. The AND gate 70, which is thus associated with channel A, has its other input connected to the line 59 to be enabled therefrom at the same time as the AND gates 49 and 42. The other AND gate 71 of this pair, which is similarly associated with channel B, has its other input connected to the line 60 to be enabled therefrom at the same time as the AND gates 50 and 43 and in antiphase to the AND gate 70.

The other pairs of AND gates 72 and 73, 74 and 75 are similarly associated with channels A and B. In this way AND gates 72 and 74 receive channel A command signals on output lines 23*b* and 23*a* respectively and are enabled from the line 59 at the same time as AND gate 70. Also AND gates 73 and 75 require command output lines 33*b* and 33*a*, respectively and are enabled with AND gate 71.

The OR gates 76, 77 and 78 therefore supply the *c*, *b* and *a* command signals of the channels A and B on alternate cycles of the display units 15 and 16. These signals are supplied over lines 80, 81, 82, respectively to the control logic 64.

A binary "1" on line 80 represents a "write" command, a binary "1" on line 81 represents a "write and unlock" command, and a binary "1" on line 82 represents a "read" command. The operation of the control logic in response to these commands will now be described with reference to FIG. 2 which is a circuit diagram of the control logic 64.

Figure 2:
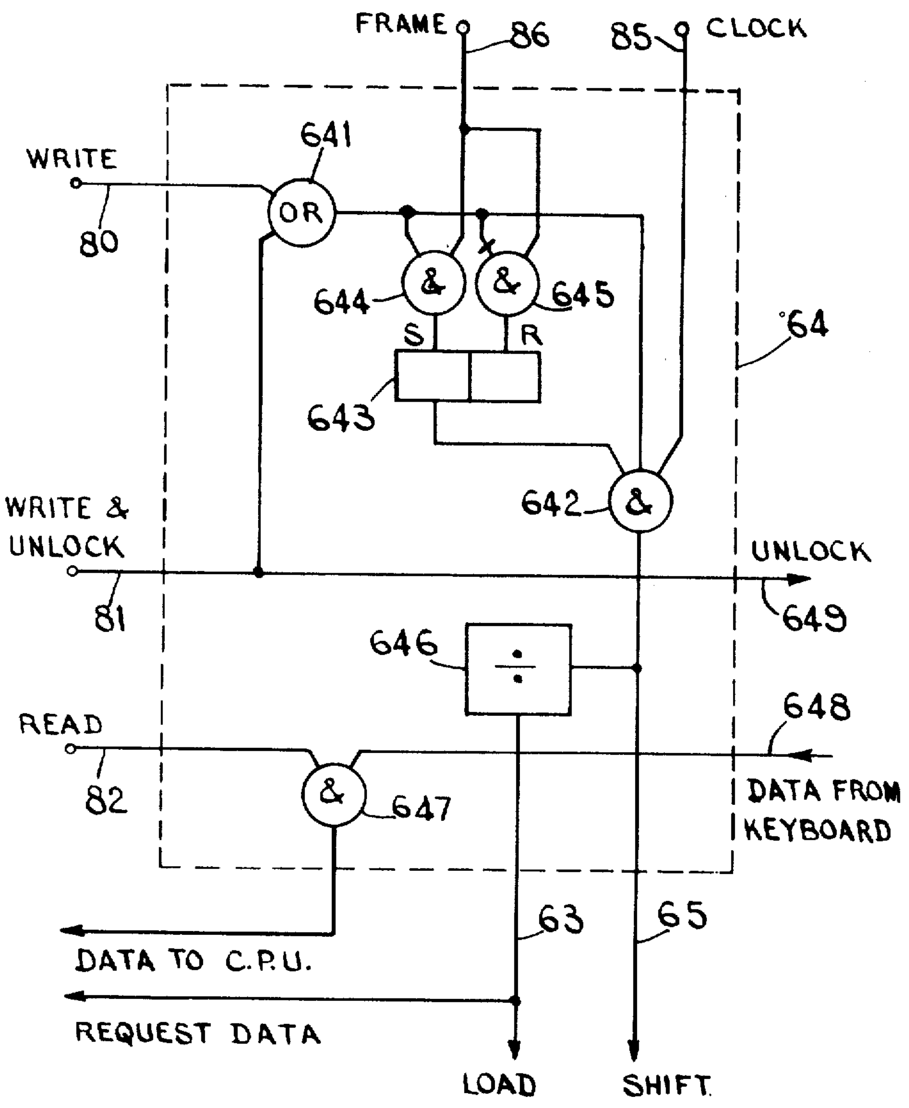

Referring to FIG. 2, the command signals on lines 80 and 81 are combined in an OR gate 641, the output of which is applied as an enabling signal to an AND gate 642 which feeds clock pulses on line 85 from the clock 87 to the shift input of the shift register 46, over line 65. The AND gate 642 is also controlled by the state of a flip-flop circuit 643, the gate 642 being enabled only when the flip-flop is in its set state. The flip-flop is triggered into its set state by means of an AND gate 644, which detects the simultaneous occurrence of a write command on line 80 (or a write and unlock command on line 81) and a frame signal on the third output 86 of the sync control circuit 55, the flip-flop then remaining in this state until it is re-set by means of an AND gate 645 which detects the occurrence of a frame signal at output 86 in the absence of a command signal on either line 80 or 81.

The AND gate 642 may also have a further input (not shown) which causes the gate to be inhibited when a binary "1" is applied thereto, this input being connected to the sync control 55 and being arranged to suppress the operation of the AND gate 642 during the fly-back periods of the display units.

The output of the AND gate 642 is also applied to a 24-state binary counter 646 which acts as a frequency divider producing one output pulse on line 63 for every twentyfour clock pulses passing through the gate 642. This pulse acts to enable the AND gate 45 (FIG. 1) so as to cause a 24-bit word to be read, in parallel, into the buffer store 41 from lines 40.

The output pulse on line 63 may also be applied back to the processor 10 as shown, as a request for more data from the processor.

The read command signal on line 82 enables an AND gate 647 so as to cause it to pass data on a line 648 from keyboards (not shown) associated with the display units 15, 16 back to the processor 10. The keyboards are of known construction and do not form any part of the present invention, and will therefore not be described in detail in the present specification. Briefly, however, the keyboards are so designed that, when any key is depressed, all the keys on that keyboard are automatically locked until an unlocking signal is received, the purpose of this being to prevent data from being keyed in faster than it can be handled by the processor 10. Unlocking of the keyboards is effected by the write and unlock command on line 81, which is fed to the keyboards by way of line 649.

The preferred basis for the timing signals is an accurate crystal clock operating at a frequency equivalent to the speed of operation required of the shift register 46. Such a clock is shown at 87 and supplies the line 85 and also a line 88 to the sync control circuit 55, which conveniently comprises a counter arrangement for counting down to effect supply of signals on lines 53, 54 and 86, respectively.

I claim:

1. In a data display system comprising a data processor and a plurality of high speed repetitive display units, means for interconnecting said processor and said units comprising:

timing means for producing sequencing signals for selecting each of said display units in turn;

a plurality of signal channels from said processor, one for each display unit, each channel comprising separate command and data signal paths;

data signal storage means, common to all said data signal paths;

first switching means, responsive to said sequencing signals, for connecting the data signal path corresponding to the currently selected display unit to the data storage means;

second switching means, responsive to said sequencing signals, for applying data from the data storage means to the currently selected display unit for updating the display provided by that unit;

a plurality of command signal storage means respectively connected to said command signal paths, each command storage means thus being capable of having command signals written into it from its corresponding command signal path during periods when the corresponding display unit is not selected;

third switching means, responsive to said sequencing signals, for selecting command signals from the command storage means corresponding to the currently selected display unit; and control means responsive to the command signals so selected by said third switching means to control read in and read out of data to and from said data storage means.

2. A system according to claim 1 wherein said timing means comprises: a clock for producing clock pulses at a predetermined rate; synchronisation control unit responsive to the clock pulses to produce line and frame synchronisation signals for said display units; and a sequencing circuit having a plurality of stable states, one for each display unit, and responsive to signals from said synchronisation control unit to switch from one stable state to the next in a predetermined sequence upon completion of a frame by a display unit.

3. A system according to claim 2 wherein said data storage means comprises a shift register and said control means is operable in response to a said control signal to cause data to be read into the data storage means in parallel from the first switching means and to be read out therefrom in series to said second switching means.

4. A system according to claim 3 wherein said control means comprises gating means, responsive to said selected command signal, for applying said clock pulses to said shift register as shift pulses.

5. A system according to claim 4 wherein said control means further includes frequency dividing means for dividing the frequency of said clock pulses, after passing through said gating means, to produce a load signal for causing data to be read into said shift register.

* * * * *